Patented Mar. 7, 1933

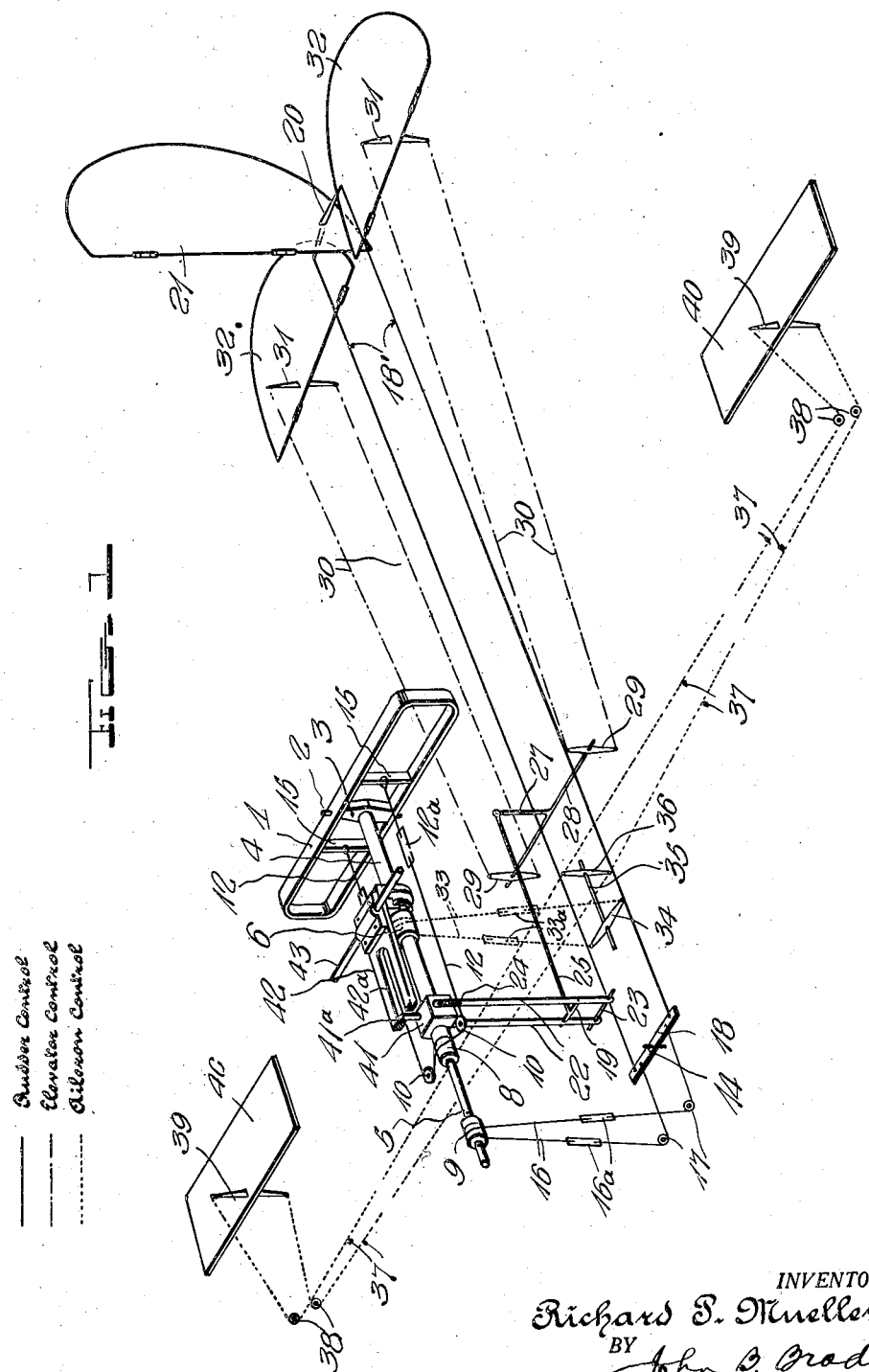

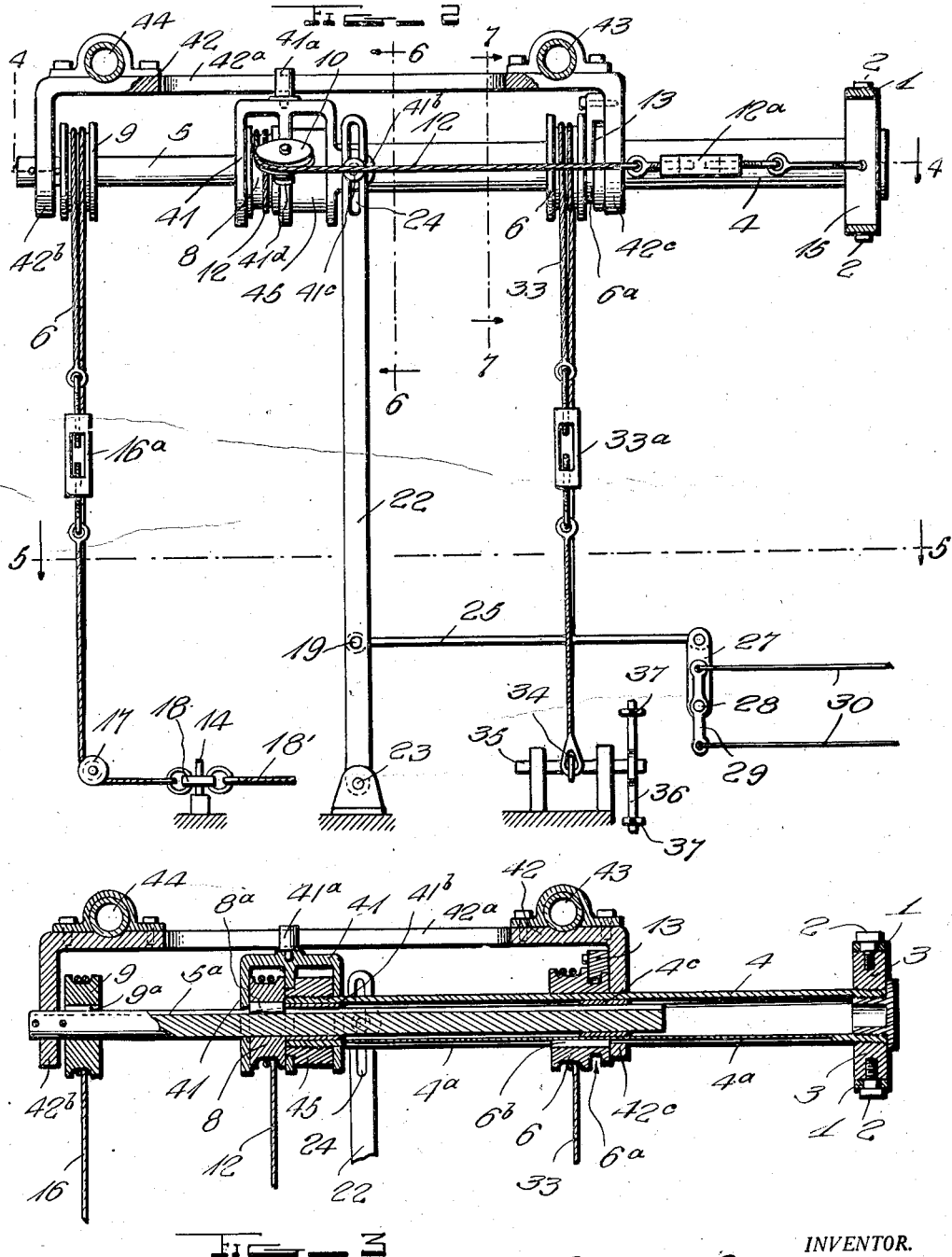

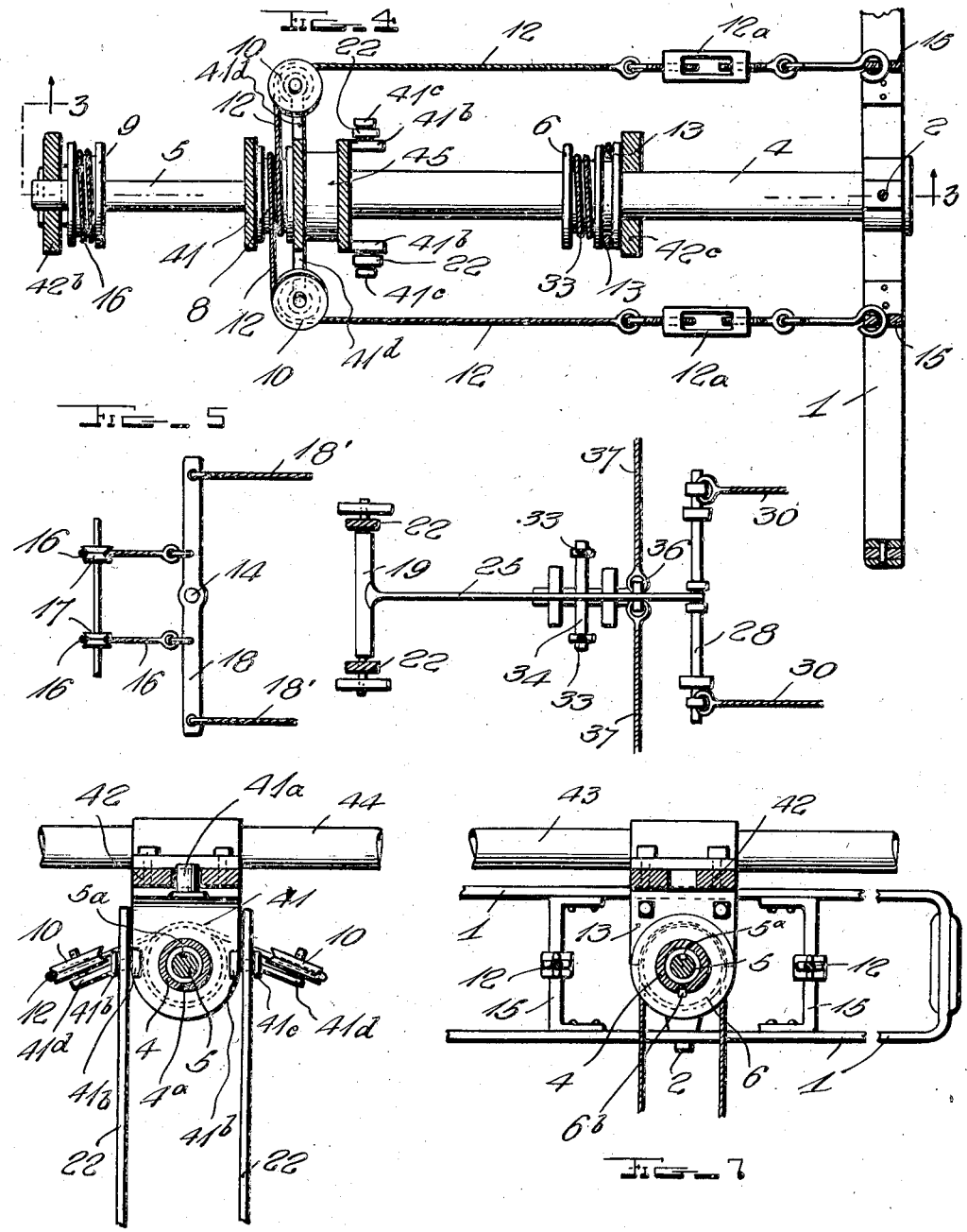

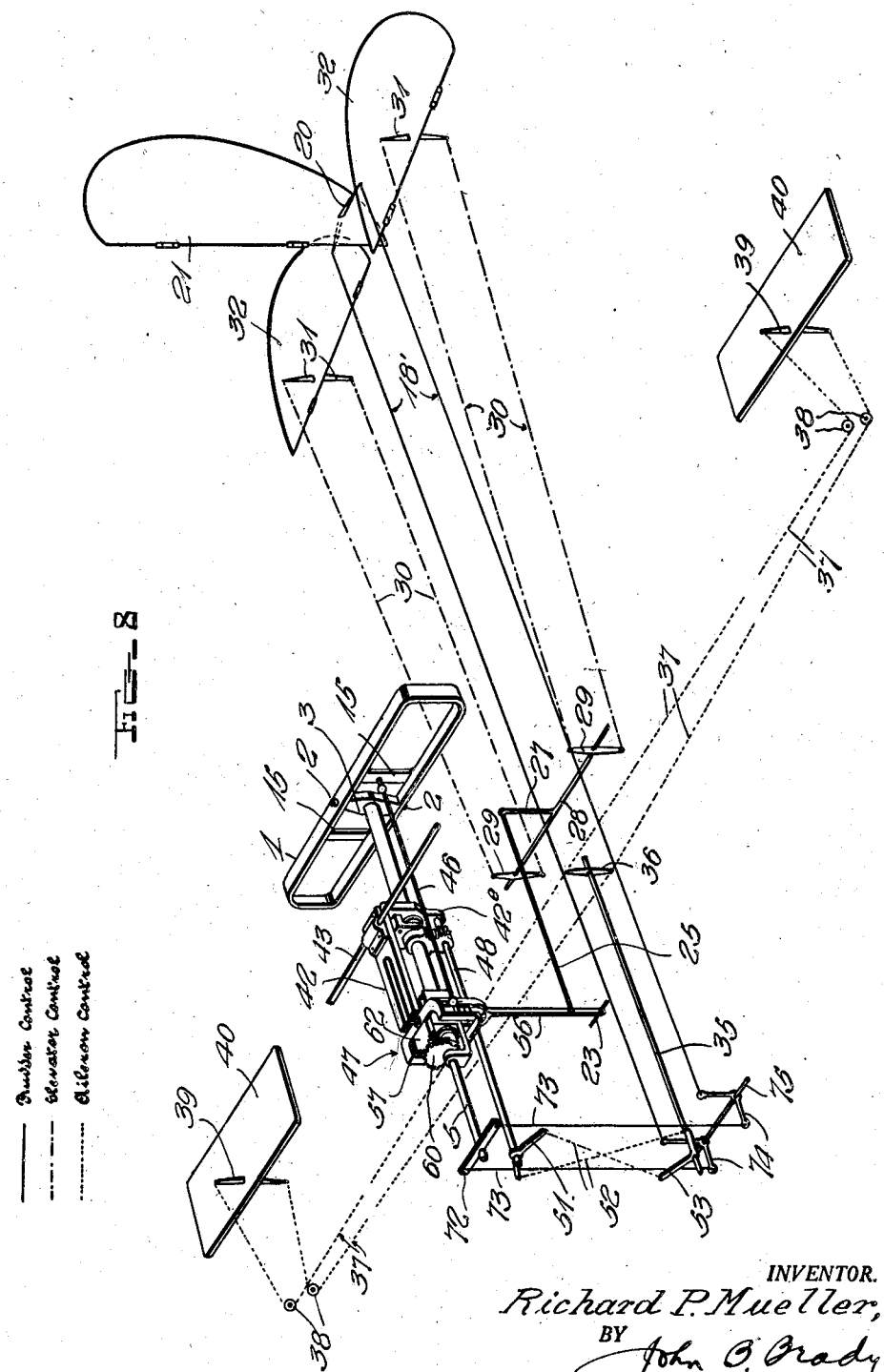

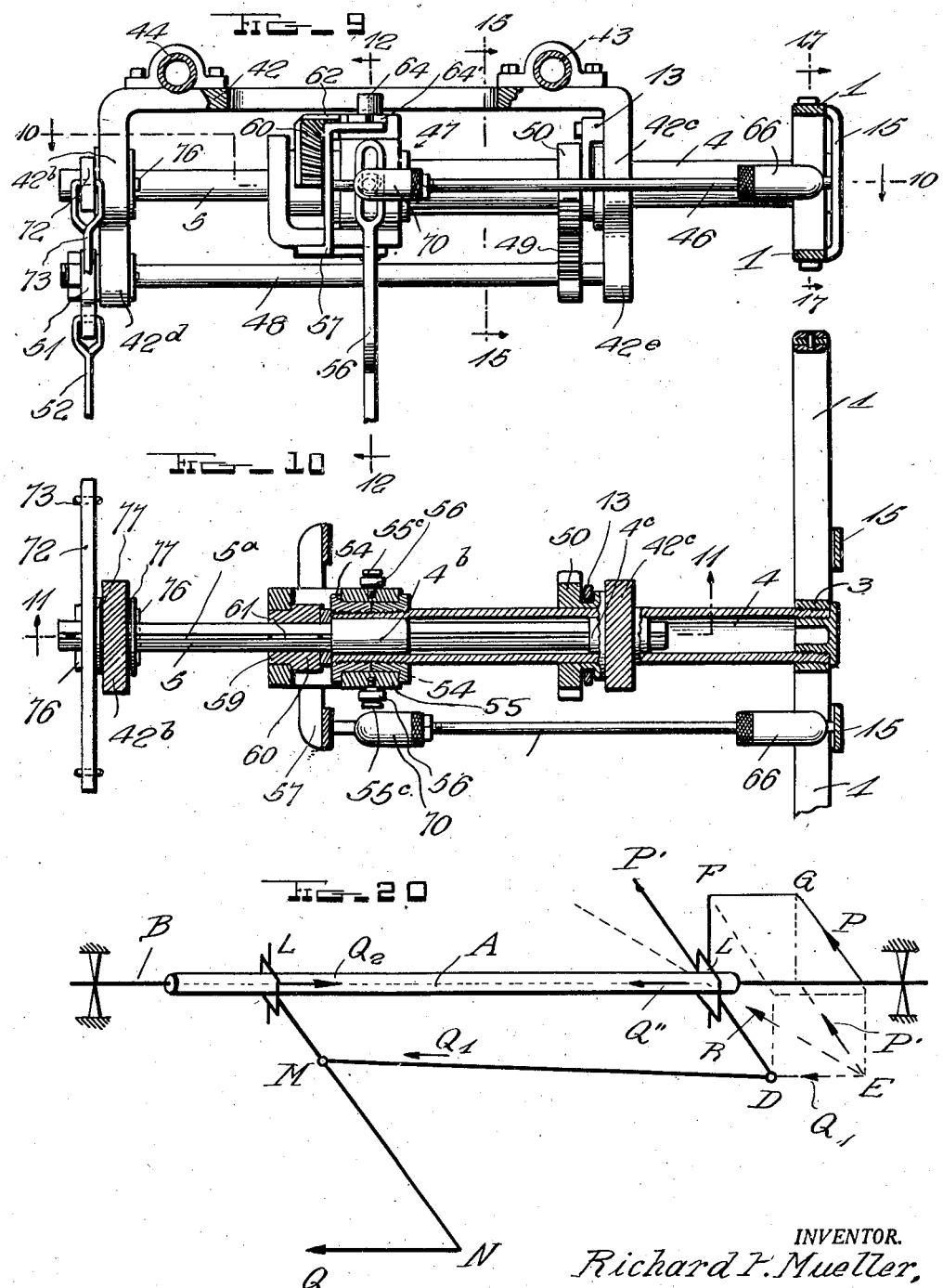

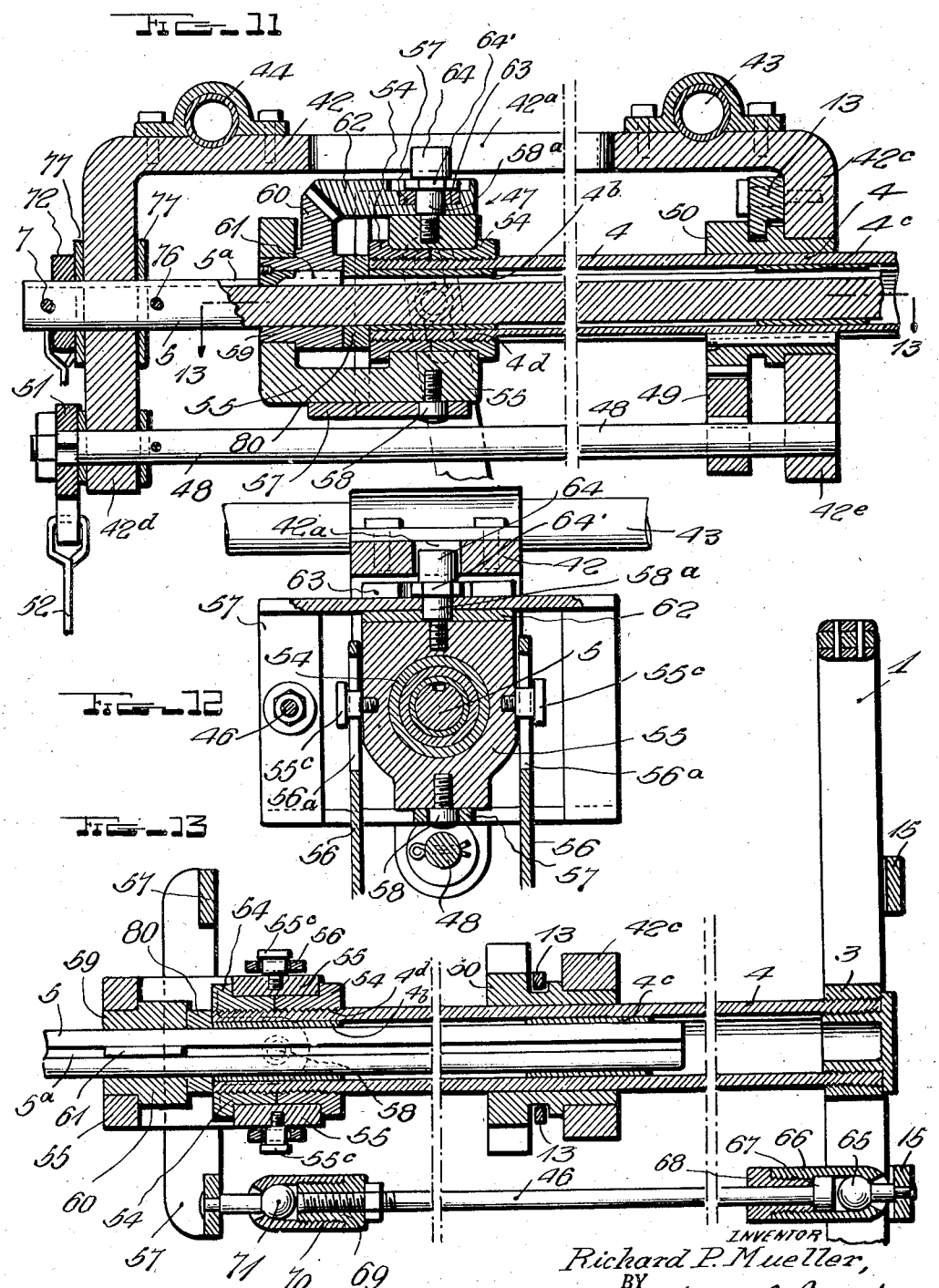

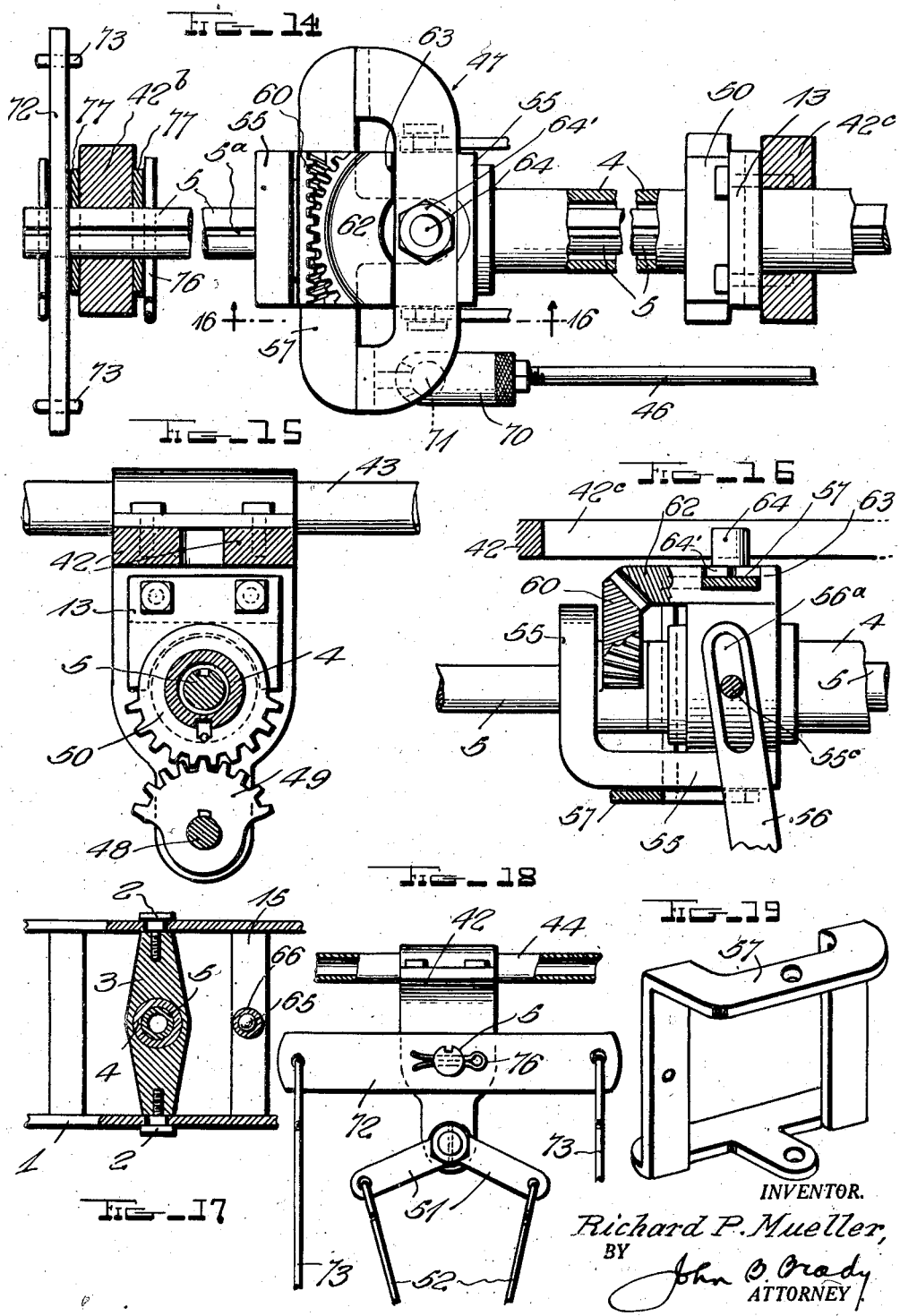

1,900,068

UNITED STATES PATENT OFFICE

RICHARD P. MUELLER, OF NEW YORK, N. Y.

CONTROL MECHANISM FOR AIRCRAFT

Application filed March 20, 1931. Serial No. 524,184.

My invention relates broadly to control mechanism for aircraft and more particularly to a simplified construction of three-way control for enabling the pilot to control a multiplicity of functions of the aircraft.

One of the objects of my invention is to provide a simplified construction of control mechanism for aircraft wherein a single hand control device is employed for effecting a multiplicity of operations in the steering of the aircraft and controlling the navigation thereof.

Another object of my invention is to provide a simplified system of manual control for aircraft operation in which the same hand grip device which is grasped by the pilot may be moved to a multiplicity of positions for effecting a multiplicity of different controls for the aircraft while maintaining the control device immediately in front of the pilot.

Still another object of my invention is to provide a construction of steering mechanism for aircraft in which a manual control device may be grasped by the pilot and given a rotative movement, a translatory sliding movement, or an oscillatory movement for effecting a multiplicity of operations required for the navigation of aircraft.

A further object of my invention is to provide an arrangement of mechanical system on aircraft for eliminating the independent rudder control, aileron control and control for the elevator planes which are now employed.

Other and further objects of my invention will be understood from the specification hereinafter following by reference to the accompanying drawings, in which:

Figure 1 is a perspective view diagrammatically illustrating the arrangement of rudder control mechanism, elevator plane control mechanism and the aileron control mechanism which is actuated from a single manual control member adjacent the pilot's position in the aircraft, the rudder control being shown in full lines, the elevator plane control being shown in dash and dot lines, and the aileron control being shown in dotted lines only; Fig. 2 is a side elevation on an enlarged scale of the control mechanism of my invention; Fig. 3 is a central vertical longitudinal sectional view taken substantially on line 3—3 of Fig. 4; Fig. 4 is a horizontal sectional view taken on line 4—4 of Fig. 3; Fig. 5 is a horizontal sectional view taken substantially on line 5—5 of Fig. 2; Fig. 6 is a transverse, vertical, section on line 6—6 of Fig. 2; Fig. 7 is a transverse, vertical section on line 7—7 of Fig. 2; Fig. 8 is a perspective view illustrating a modified form of control mechanism embodying the principles of my invention; Fig. 9 is a side elevation of the modified construction of control mechanism illustrated in Fig. 8; Fig. 10 is a horizontal cross-sectional view taken on line 10—10 of Fig. 9; Fig. 11 is an enlarged cross-sectional view on line 11—11 of Fig. 10 showing the arrangement of parts in the modified form of control mechanism illustrated in Figs. 8–10; Fig. 12 is a vertical sectional view taken on line 12—12 of Fig. 9; Fig. 13 is a horizontal sectional view taken on the line 13—13 of Fig. 11; Fig. 14 is an enlarged plan view of the modified form of control mechanism illustrated in Figs. 8–10; Fig. 15 is a vertical, sectional view on line 15—15 of Fig. 9; Fig. 16 is a fragmentary side elevation partially in cross-section of the control head in the modified form of control mechanism of my invention; Fig. 17 is a fragmentary cross-sectional view through a portion of the manual control device or hand grip taken on line 17—17 of Fig. 9; Fig. 18 is an end view of the lever members which connect with the aileron control and the rudder control in the modified arrangement of my invention; Fig. 19 is a perspective view of one part of the control head in the control mechanism of my invention; and Fig. 20 is a theoretical view showing the forces which are employed in the control mechanism of my invention.

My invention is directed to a simplified, compact and practical form of control mechanism for aircraft which will enable the average person familiar with the driving of an automobile to become familiar with the piloting of an aircraft. The mechanism of my invention may be operated with one hand when in horizontal flying order for carrying out all of the functions required in the aircraft manipulation. The mechanism of my invention is designed so that it may be mounted directly from the fuselage of the aircraft in a position below the instrument board. From the pilot's position the only exposed portion of the mechanism is the hand grip device. Once a person becomes familiarized with the successive movements to be imparted to the hand control, the manipulation of the aircraft becomes simple. In taking off and landing the pilot grasps the hand control with both hands and is enabled to effect a gradual changing of the elevator planes and ailerons according to the requirements of attaining the proper altitude or effecting a landing under conditions of the proper deceleration. All the functions of the navigation of the aircraft are under the hand control of the pilot and for that reason the failure of the pilot to perform all functions for the proper manipulation of the aircraft is highly remote. That is to say, in the usual arrangement of independent hand and foot controls for the navigation of the aircraft, conditions may arise where the pilot in excitement at times of danger may forget to straighten out the rudder in effecting a landing although manipulations of the elevator plane and ailerons may be carried out. In the mechanism of my invention, foot controls in the steering are eliminated.

The concentration of the controls under the same hand manipulating device also insures the speedy reversal of any of the several operations. The hand control of my invention is particularly effective for the rapid banking of an aircraft for preventing excessive or dangerous side slipping. The hand control of my invention is particularly effective for bringing a plane out of a tailspin. For example, a plane in going into a tailspin can only be brought out of the tailspin by a quick reversal of the rudder. My control mechanism is particularly fitted for effecting a quick reversal of the rudder under hand control for taking the plane out of a tailspin and to effect side slipping. Where the functions are separated as is now the practice requiring the operationg of foot controls in addition to the operation of the steering wheel or steering stick, the likelihood of confusion of the pilot under dangerous conditions is very great. In the apparatus of my invention where the several steering functions are concentrated in one hand controlled mechanism the steady check of each operation may be maintained.

The apparatus of my invention comprises a frame structure for mounting the steering mechanism from the fuselage and preferably below the instrument panel in front of the pilot in a position where the pilot has his feet entirely clear and is able to control the throttle for feeding the required amount of fuel to the engine. The steering device includes a hand grip which is secured to a central hollow shaft which is telescopically mounted over an auxiliary shaft adapted to transmit motion to a rudder control mechanism when oscillatory motion is imparted to the hand grip for steering the aircraft. The central shaft may be given a translatory movement for shifting a set of levers for controlling the elevator planes. Rotative movement may be imparted to the hand control for rocking the ailerons. That is to say, the hand control has three separate movements, that is a translatory movement in a horizontal direction for controlling the angular position of the elevator planes; rotative movement for controlling the angular movement of the ailerons; and oscillatory movement for controlling the position of the rudder.

Referring to the drawings in detail reference character 1 designates the aircraft control member which is pivotally mounted at 2 to the cross head 3 of the longitudinally shiftable and rotatable shaft member 4. The rockable or rotatable shaft member 4 is journalled in a bearing in supporting frame 42 at the end 42c thereof and is longitudinally slidable through the drum 6. The drum 6 is keyed to revolve with the shaft member 4 and rolls and unrolls the cable 33 for actuating the ailerons. The ailerons are indicated at 40 as being controlled through lever members 39 which are connected to cables 37 extending longitudinally of the plane and which are actuated by means of cross head 36 rotated on shaft 35 by movement of the cross arm 34 connected with the opposite ends of cables 33 which are wound on drum 6. Turn buckles 33a are inserted in the cable 33 in order that the required tension may be maintained. The translatory and rotatable shaft member 4 which is slidable through the bearing in the depending portion 42c of frame 42 carries the end member 41 having transversely extending pins projecting therefrom which engage slots in the ends of the lever members 22. Lever members 22 are journalled at 23 and have a transversely extending rod 19 pivotally connected adjacent the lower ends thereof to each of the lever members 22. A longitudinally extending rod 25 extends from the transverse member 19 to the actuating lever 27. Lever 27 is in turn connected to the laterally extending rod member 28 to which the cross arms 29 are connected adjacent opposite ends thereof. Cables extend from the ends of the cross arms 29 as shown at 30 to the elevator planes indicated at 32. Therefore the pilot by pushing or pulling on the hand control 1 directly controls the angular position of the elevator planes 32. The rotatable and slidable tubular shaft 4 telescopes over the shaft member 5. Shaft member 5 has a rotatable drum 8 slidably keyed thereon and coupled with the movable head 41 so that the rotatable drum 8 is shiftable with the longitudinal displacement or translatory motion of shaft 4 although rotatable wholly independent of the rotation of the shaft 4 as will be hereinafter described. The rotation of rotatable drum 8 in the construction illustrated in Fig. 1 is controlled, in the form illustrated in Fig. 1, by means of cables 12 which pass over guide pulleys 10 in a horizontal direction and wrap around the rotatable drum 8. A drum 9 is carried by the end of the shaft member 5 and is rotated when shaft member 5 is rotated by the operation of cables 12 over drum 8. The cables 12 are tensioned through turn-buckles 12a and connect to the transversely extending members 15 on the manual control member 1. Oscillatory movement of the manually controlled member about its pivots 2 produces a displacement in position of the cables 12 which are wrapped or unwrapped in the selected directions in rotatable drum 8 for imparting rotatable movement to the shaft member 5. This rotatable movement is assured by means of the sliding key connection between the rotatable drum 8 and the shaft member 5 throughout the entire path of movement of the shaft member 4. The drum 9 has cables 16 wound thereover, which cables are tensioned by means of turn-buckles 16a and are directed over guide pulleys 17 to opposite sides of the cross-bar 18 which is pivoted at 14. The cables 19 extending from the ends of the cross bar 18 connect to the opposite ends of the lever member 20 for controlling the rudder 21. The entire control mechanism is supported from the fuselage of the plane from a framework 42 which is mounted by means of suitable supporting rod members 43 and 44 or other desired form of frame structure. The frame 42 is longitudinally slotted at 42a to allow translatory movement of the pin member 41a projecting from the head 41 which precludes the head 41 from shifting angularly out of its vertical position.

Fig. 2 shows more clearly the arrangement of the several parts of the control mechanism in side elevation and cross section. The supporting means for the control mechanism comprising the frame 42 is mounted at opposite ends by means of rod members 43 and 44 having depending end portions at 42b and 42c. The end portion 42c carries the retaining member 13 which extends into an annular recess 6a in the drum 6 thereby maintaining the drum immediately adjacent the depending end 42c of the frame 42 regardless of the longitudinal movement of the shaft 4. The drum 6 is maintained in keyed relation to the rotatable and longitudinally shiftable shaft 4 so that the drum 6 is revolved with the rotation of the manual control member 1. That is to say, the tubular shaft 4 has a longitudinal keyway 4a therein while the rotatable drum 6 carries a key 6b which rides in the keyway 4a locking the drum 6 for rotary movement under control of rotary movement of tubular shaft 4, although permitting longitudinal movement of tubular shaft 4. The head 41 is in the form of a yoke, one portion of which is secured to the end of the tubular shaft 4 by means of the screw threaded collar 45. The head 41 which is secured to the end of the tubular shaft 4 has a pair of laterally extending side members 41b thereon from which the pins 41c project and extend through the slots 24 in the movable lever member 22. The other portion of the yoke formed by the head 41 provides a housing for the rotatable drum 8. The rotatable drum 8 is provided with a key 8a which slides in the longitudinally extending keyway 5a in the shaft 5. The shaft 5 extends between the depending ends 42c and 42b of the frame 42. The shaft 5 is centered within the tubular shaft 4 by means of spaced anti-friction sleeves carried interiorly of the shaft 4 at 4b and 4c. I may employ ball bearing sleeves for further reducing the effects of friction. For purposes of illustration, however, I have confined the drawings to a disclosure of simple sleeve devices 4b and 4c. Rotatable shaft 5 carries rotatable drum 9 directly keyed thereto by means of key 9a fitting in the longitudinally extending keyway 5a in the shaft member 5. The fact that shaft member 5 extends entirely across the space between the depending ends of frame 42 as shown at 42c and 42b insures a rigid construction for the aircraft control. The tubular shaft 4 is longitudinally slidable over the entire length of shaft 5 by telescoping thereover at the same time that the tubular shaft 4 is rotatable entirely independent of the rotation of the shaft 5. The separation of the several movements enables the pilot to secure the proper annular position of the elevator planes 32 by translatory movement of the manual control 1 wherein the pilot grasps the hand holds at the opposite ends of the manual control 1 and moves the shaft member 4 forward or backward for correspondingly shifting lever members 22 and controlling cables 25. Independently of the translatory movement, rotatable movement of the manual control 1 serves to rotate drum 6 keyed to the shaft 4 for moving cables 33 and imparting corresponding movement to cross arm 34 and rotating shaft 35 to rotate the head 36 and correspondingly shift cables 37 for changing the annular distribution of the ailerons 40. The oscillatory movement of the manual control 1 serves to move cables 12 which operate over the drum 8 for imparting rotary movement to shaft 5 and revolving drum 9. Cables 16 operating over pulleys 17 control the cross arm 18 pivotally mounted at 14 for shifting the cables 18' and controlling the rudder 21 as heretofore described.

The arrangement of the cables 12 with respect to the drum 8 is shown more clearly in Fig. 4. The pulleys 10 are so disposed on the head 41 that the direction of movement of the cables 12 is abruptly changed to a direction normal to the shafts 4 and 5. The mounting of the pulleys 10 from the head 41 is shown more clearly in Fig. 6 wherein the angularly disposed lugs 41d extend from opposite sides of the head 41 and serve to guide the cables 12 over the rotatable drum 8.

Fig. 5 shows a plan view of the rudder control mechanism, the aileron control mechanism and the control mechanism for the elevator planes illustrating the arrangement of levers and cables connected therewith.

Fig. 7 shows more particularly the arrangement of the manual control device 1 with respect to the cables 12 and the drum 6 which is rotated for operating the ailerons.

In the modified form of the aircraft control mechanism of my invention as illustrated in Fig. 8, I eliminate the use of cables extending between the manual control device 1 and the head of the control mechanism, and in lieu thereof I employ an actuating rod member 46 extending between one of the laterally disposed members 15 at one side of the manual control device 1 and the control head which I have designated in the modified form of my invention by reference character 47. The same form of longitudinally slidable shaft 4 is employed in the modified construction of my invention where shaft 4 is telescopically slidable over shaft 5 which is journaled in the frame structure 42. In the modified arrangement of my invention, the frame 42 is extended at each end thereof to include bearing means 42d and 42e in which bearings the auxiliary shaft 48 is journaled. The shaft 48 carries a gear member 49 thereon which meshes with the gear member 50 which is keyed to the tubular shaft 4. Rotation of the tubular shaft 4 through predetermined limits by rotation or angular movement of the control device 1 through a predetermined limit serves to impart rotary movement to auxiliary shaft 48 and rock the angularly disposed laterally arranged levers 51 which connect to cables 52 with the ends of levers 53 carried by the shaft 35 corresponding to the similarly numbered shaft shown in Fig. 1. The lever 36 is connected to the cables 37 for the control of the ailerons 40 in a manner similar to the control described in connection with Fig. 1. The shaft 5 which is journaled in the ends of the frame 42 at 42b and 42c serves to support the tubular shaft 4 both in its projected and its telescoped positions as the shaft is shifted from a full projected position to an intermediate forward position. The sleeves 4b and 4c serve as anti-friction supports to center the hollow shaft 4 telescopically over the shaft 5 in the manner described in connection with the arrangement illustrated in Figs. 1–7. Ball or roller bearing supports may be employed in lieu of the sleeves 4b and 4c in order to more fully reduce frictional losses. The end of the tubular shaft 4 is screw threaded at 4d and receives a pair of screw threaded collars 54 directed end to end and providing a securing means for the head 55 which is slidable with the tubular shaft 5. In opposite sides of the head 55, I provide pins 55c corresponding to the arrangement of pins 41c in Fig. 2. A yoked lever 56 has its yoked ends secured through pins 55c, the pins being operative in the slots 56a in each end of the yoke as the yoked lever 56 is angularly shifted around the pivot 23. The lever 56 is connected to the link 25 which in turn connects through lever 27 to the rotatable rod member 28 for rocking the levers 29 which control the elevator planes in the manner similar to that illustrated in Fig. 1. The lever 56 is equivalent to the lever 22 in Fig. 1.

The head 47 in the modified arrangement of my invention comprises a transversely extending member 57 which is pivoted at 58 and 58a to the member 55. The member 55 embraces the collars 54 on the end of the tubular shaft 4 and also embraces the annular sleeve portion 59 of the segmental gear 60. The segmental gear 60 is keyed as shown at 61 to slide in the longitudinal slot 5a in shaft 5 at the same time that segmental gear 60 imparts movement to shaft 5 when the gear 60 is operated by the shifting of segmental gear 62. Segmental gear 62 is rotated by the annular movement of the transversely extending member 57. It will be observed that member 57 has an upper portion which extends through a slot 63 in the segmental gear 62 to insure the rotative movement of the segmental gear 62 as the transverse member 57 is rocked from side to side around the pivots 58 and 58a. The guide stem 64 is secured in position in member 55 by means of nut 64' and provides means for preventing angular displacement of member 55 by virtue of coacting slot 42a. The angular position of the transversely extending member 57 is controlled through the connecting rod 46 which extends from one of the transverse strips 15 on the manual control device 1. In order to allow the required longitudinal and angular movement of connecting rod 46 each end of the rod is secured by a ball and socket joint. I have shown at one end of the rod a ball 65 supported from the member 15 of the manual control device 1 over which there is fitted the sleeve 66 into which the head 67 of the connecting rod 46 extends, the rod being secured by means of bushing 68 in the socket. The other end of the connecting rod 46 extends through and is secured into screw threaded bushing 69 which engages the screw threaded sleeve 70, the sleeve 70 being secured over the ball 71 which is supported from the angularly shiftable member 57.

An independently rotatable ring member 80 is disposed between the end of the tubular shaft 4 and the gear 60 for positively spacing the parts of the mechanism and maintaining the segmental gear 60 in mesh with the segmental gear 62 for insuring rotative movement of shaft 5 under conditions of rocking movement of transversely extending member 57.

It will be observed that the connection between the angularly movable member 57 and the hand grip 1 is such that as the hand grip is rotated, the connecting rod 46 changes its angular position but does not shift the position of the angularly movable member 57. On the other hand, when pressure is brought against the hand grip 1 the transverse member 57 is rocked imparting rotatable movement to segmental gear 62 which meshes with gear 60 and revolves shaft 5. The end of shaft 5 carries the transversely extending bar member 72, the opposite ends of which are connected to cables or links 73 which connect to the extremities of the lever members 74 which are independently pivotally mounted at 75 for controlling the cables 19 and operating the rudder 21. As represented in Figs. 9, 10 and 11, the position of shaft 5 with respect to the supporting frame 42 is maintained by cotter pins 76 operating against washers 77. It will be observed that the entire head 47 is shiftable longitudinally of the frame 42 as the hand control is retracted or extended, resulting in the movement of the yoke lever 56 for the control of the elevator planes 32. When the hand device 1 is rocked or shifted angularly in either direction in a vertical plane, shaft 4 is revolved, thereby revolving segmental gear 50 and imparting movement to segmental gear 49 thus revolving shaft 48 and angularly rocking levers 51 for moving cables 52. Levers 53 are thus rocked and cross bar 36 moved thus operating cables 37 and changing the angular position of the ailerons 40. Either of the movements heretofore described produces no movement at all with respect to the transverse member 57. Member 57 is shifted angularly by force imparted through rod 46 as the hand member 1 is shifted from side to side.

In Fig. 20, I have shown the geometrical direction of forces employed in the control system of my invention. The hollow tubular shaft A has been designated as sliding over the rotatable shaft B. Assuming that this sliding operation is frictionless and that all joints in the system are frictionless, the balanced operation of the control system will be understood. The parallelogram of forces drawn at D, E, F and G represents a lever. The distances between the joints L and E and M and D are fixed. Considering the system in a condition of balanced equilibrium and the case when the forces Q and P (gear resistance) are zero, the force Q can now be increased. Lever LM may turn either at the joint M or L. Turning at the joint M would suggest a sliding movement of shaft A because of a force in the direction $Q^2$. However since the distances MD and LE are fixed the levers D, E, F, and G would have to turn simultaneously with the lever LM. This movement would at once meet reaction in the gear resistance with force P. The force P may be projected at P'. The force $Q_1$ (joint resistance) may be projected at $Q_1'$ where the forces may be resolved into the resultant R. The resultant R may be resolved into $Q_1''$ and $P_1'$. That is to say $P_1'$ represents a force which has its reaction in the bearings of the system and $Q_1''$ represents a force in shaft A in the direction L. The force $Q_1''$ opposes the force $Q_2$ which force has suggested a sliding movement in shaft A. The force $Q_2$ and its reaction $Q_1''$ increase and decrease proportionally with a changing force Q and the system remains balanced at all times, with the result that for geometrical reasons the shaft A does not slide under the influence of a force Q.

With the above analysis it will be seen that regardless of what forces may be applied against the elevator planes, this will not influence the operation of the control of the rudder or the ailerons. Correspondingly, regardless of the forces against the rudder this will not have any influence upon the operation of the ailerons or the elevator planes. Correspondingly, the force which may be employed against the ailerons will not influence the operation of the control mechanism so far as the control of the rudder or elevator planes is concerned.

I have found the control mechanism of my invention highly practical in its construction and operation and as enabling any one to become rapidly skilled in the maneuvering of an aircraft. It will be understood that the throttle valve for controlling the fuel supply to the engine is the only other control which the pilot must adjust by movement of the foot while all other controls are directly under the constant surveillance of the pilot who has his hands on the manual control mechanism.

While I have described the system of my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. Control mechanism for adjusting the angular position of the rudder, elevator planes and ailerons of an aircraft, comprising a frame structure, a pair of telescopic shafts journaled in said frame structure, one of said shafts having translatory movement with respect to the other of said shafts, a hand grip device connected to said transitory movable shaft, rotary means controlled by the rotation of said translatory movable shaft, independent rotatable means on the other of said shafts controlled by oscillatory movement of said hand grip device, and independent cable connectors extending from said rotary means and connected with said rudder and said ailerons for controlling the operation of the aircraft.

2. Control mechanism for adjusting the angular position of the rudder, elevator planes and ailerons of an aircraft, comprising a frame structure, a pair of telescopic shafts journaled in said frame structure, one of said shafts having translatory movement with respect to the other of said shafts, a hand grip device connected to said translatory movable shaft, rotary means controlled by the rotation of said translatory movable shaft, independent rotatable means on the other of said shafts controlled by oscillatory movement of said hand grip device, angularly movable means fulcrumed adjacent said shaft and connected with said shaft for angular displacement in accordance with the translatory movement thereof, a connection between said angular movable means and said elevator planes, and cable connections between the rotary means on each of said shaft members and the rudder and the ailerons whereby movement of said rudder, ailerons and elevator planes may be controlled from the same hand grip device.

3. Control mechanism for adjusting the angular position of the rudder, elevator planes and ailerons of an aircraft, comprising a frame structure, a pair of telescopic shafts journaled in said frame structure, one of said shafts having translatory movement with respect to the other of said shafts, a hand grip device connected to said translatory movable shaft, rotary means controlled by the rotation of said translatory movable shaft, independent rotatable means on the other of said shafts controlled by oscillatory movement of said hand grip device, cable carrying means disposed on said last mentioned shaft and rotatably driven by said last mentioned means for imparting angular movement to the rudder, and means displaceable by the translatory movement of the translatory movable shaft member for controlling the angular displacement of the elevator planes and the ailerons.

4. Control mechanism for adjusting the angular displacement of the rudder, elevator planes and the ailerons of aircraft comprising a supporting frame, a central shaft system journaled in said frame, said shaft system including a pair of telescopic sections, one of said sections being slidable over the other of said sections, a hand grip device pivotally mounted adjacent the end of the slidable shaft section, rotary means carried by said first mentioned shaft section, means extending between said rotary means and said hand grip device whereby oscillatory movement of said hand grip device operates to impart rotary motion to said rotary means on said first mentioned shaft section for controlling by the movement thereof the angular displacement of the rudder, and separate means controlled by the translatory motion of said second mentioned shaft section and the rotatable movement of said second mentioned shaft section for controlling the angular position of the elevator planes and ailerons.

5. Control mechanism for adjusting the angular position of the ailerons, rudder and elevator planes of an aircraft, including a frame structure adapted to be supported from the fuselage of an aircraft, a rod member mounted horizontally in said frame structure, a tubular member telescopically journaled upon said rod member and projectable and retractable in a horizontal direction with respect to said frame structure over said rod member, rotary mechanism connected with the end of said hollow tubular member, a transversely extending hand grip pivotally mounted adjacent the other end of said hollow tubular member, means extending from said transversely extending hand grip for imparting rotary movement to said rotary mechanism in proportion to the angular displacement of said transverse lever, means controlled by said rotary mechanism for controlling the displacement of said rudder and means controlled by translatory and rotatable movement of said lever for controlling the angular displacement of said elevator planes and the position of said ailerons.

6. Control mechanism for adjusting the angular positions of the ailerons, rudder and elevator planes of an aircraft comprising a tubular shaft member, a hand grip device connected with said tubular shaft member, a frame for mounting said tubular shaft member, said hand grip device being angularly movable in a horizontal plane and said tubular shaft member being horizontally shiftable and independently rotatable, a transversely extending member pivotally mounted with respect to said tubular shaft, and a connecting rod extending between said transversely extending member and said hand grip for converting angular movement of said hand grip in a horizontal plane to rotary movement for controlling the operation of the rudder, while horizontal movement of said hand grip and rotatable movement thereof operates to change the angular position of the elevator planes and the position of said ailerons respectively.

7. Control mechanism for aircraft comprising a frame structure supported with respect to the fuselage of an aircraft, a rotatable and longitudinally slidable shaft member, gears actuated by said shaft member, a hand grip pivotally connected adjacent the end of said shaft member, a transversely extending member pivoted adjacent the opposite end of said shaft member, a connecting rod extending between said hand grip and said transversely extending member, and a multiplicity of independent controls operated through said gearing and according to the longitudinal movement of said shaft member under control of said hand grip.

8. Control mechanism for aircraft comprising in combination a supporting frame, a multiplicity of shaft systems journaled in said frame, one of said shaft systems being mounted above another of said shaft systems and comprising a pair of longitudinally slidable portions, a hand grip device pivotally connected adjacent the end of one of said longitudinally slidable portions, a transversely extending member pivotally mounted adjacent the end of said last mentioned longitudinally slidable portion, a connecting member extending between said hand grip device and said transversely extending member, and a gearing connection between one of said shaft systems and the other of said shaft systems for transmitting control forces from said hand grip device.

9. Control mechanism for aircraft comprising in combination a supporting frame, a multiplicity of shaft systems journaled in said frame, one of said shaft systems being mounted above another of said shaft systems and comprising a pair of longitudinally slidable portions, a hand grip device pivotally connected adjacent the end of one of said longitudinally slidable portions, a transversely extending member pivotally mounted adjacent the end of said last mentioned longitudinally slidable portion, means for converting angular movement imparted to said transversely extending member to rotary movement of the other shaft portion of said first mentioned shaft system, and a gearing connection between the first mentioned shaft portion of said first mentioned shaft system and said second mentioned shaft system for transmitting control forces from said hand grip device according to the horizontal angular movement, the rotatable movement of said hand grip device in a vertical plane, or the sliding movement of the first mentioned shaft portion of the first mentioned shaft system.

10. Control mechanism for aircraft comprising in combination a frame structure adapted to be supported with respect to the fuselage of an aircraft, a pair of shaft systems journaled in said frame structure in superimposed relation, a system of gears interconnecting said shaft system, one of said shaft systems including a pair of rotatable members, one of which is longitudinally slidable over the other, a hand grip device pivotally mounted on the slidable member, a head carried by the opposite end of said slidable member, a transversely extending yoke pivotally mounted on said head, a connecting rod extending between one side of said transversely extending yoke and one side of said hand grip device, a gearing connection between said yoke and the other rotatable shaft member of said first mentioned shaft system, and a motion transmitting lever extending from said head whereby movement of said hand grip device in either of three directions operates to selectively transmit forces through said lever, said gearing connection, and said system of gears for effecting aircraft control.

11. Control mechanism for aircraft comprising in combination a frame structure adapted to be supported with respect to the fuselage of an aircraft, a pair of shaft systems journaled in said frame structure in superimposed relation, a system of gears interconnecting said shaft system, one of said shaft systems including a pair of rotatable members, one of which is longitudinally slidable over the other, a hand grip device pivotally mounted on the slidable member, a head carried by the opposite end of said slidable member, a transversely extending yoke pivotally mounted on said head, a connecting rod extending between one side of said transversely extending yoke and one side of said hand grip device, an angularly rockable joint at each end of said connecting rod permitting rotation of said hand grip between limits without effect upon the movement of said transversely extending member, a gearing connection between said yoke and the other rotatable shaft member of said first mentioned shaft system, and a motion transmitting lever extending from said head whereby movement of said hand grip device in either of three directions operates to selectively transmit forces through said lever, said gearing connection, and said system of gears for effecting aircraft control.

In testimony whereof I affix my signature.

RICHARD P. MUELLER.